US008483560B2

(12) United States Patent
Miyaji

(10) Patent No.: US 8,483,560 B2
(45) Date of Patent: Jul. 9, 2013

(54) OPTICAL COMMUNICATION APPARATUS AND OPTICAL WAVELENGTH MULTIPLEXING TRANSMISSION SYSTEM

(75) Inventor: Yousuke Miyaji, Tokyo (JP)

(73) Assignee: NEC Corporation, Tokyo (JP)

( * ) Notice: Subject to any disclaimer, the term of this patent is extended or adjusted under 35 U.S.C. 154(b) by 366 days.

(21) Appl. No.: 12/829,153

(22) Filed: Jul. 1, 2010

(65) Prior Publication Data

US 2011/0008051 A1 Jan. 13, 2011

(30) Foreign Application Priority Data

Jul. 10, 2009 (JP) .................................. 2009-163247

(51) Int. Cl.
*H04B 10/08* (2006.01)
(52) U.S. Cl.
USPC .................... 398/30; 398/15; 398/17; 398/33
(58) Field of Classification Search
USPC .................. 398/1, 3–5, 15, 17, 30–33, 59
See application file for complete search history.

(56) References Cited

U.S. PATENT DOCUMENTS

| 5,436,750 | A  | * | 7/1995 | Kawano .......................... 398/10 |
| 6,504,630 | B1 | * | 1/2003 | Czarnocha et al. ............. 398/15 |
| 7,174,108 | B2 | * | 2/2007 | Kamura ......................... 398/181 |
| 7,957,643 | B2 | * | 6/2011 | Feldman et al. ................. 398/30 |

FOREIGN PATENT DOCUMENTS

JP 2006345070 A 12/2006

* cited by examiner

*Primary Examiner* — Dalzid Singh

(57) ABSTRACT

In case of a disconnection failure of an optical transmission line, a Raman amplifier generates a loss of main and supervisory signal alarms, an optical amplifier generates a loss of main signal alarm, and a supervisory signal transmission and reception unit detects the loss of supervisory signal. On the other hand, in case of a failure generated in an optical fiber, the supervisory signal transmission and reception unit performs APR control. Thus the optical amplifier stops outputting the main signal and continues to output the supervisory signal. The Raman amplifier generates the loss of main signal alarm, and the supervisory signal transmission and reception unit detects the loss of supervisory signal. The monitoring unit identifies failure point according to a combination of an existence of the loss of signal alarm by the Raman and optical amplifiers and the loss of supervisor signal by the supervisory signal transmission and reception unit.

32 Claims, 3 Drawing Sheets

Fig. 2

| NO | RAMAN AMPLIFIER 10 SV-LOS | RAMAN AMPLIFIER 10 LOS | OSC SV_LOS | OPTICAL AMPLIFIER 11 LOS | FAILURE CONTENT | FAILURE IN OPTICAL FIBER 15 |
|---|---|---|---|---|---|---|
| 1 | — | — | — | — | NORMAL | — |
| 2 | — | — | — | O | RAMAN AMPLIFIER OUTPUT REDUCED/ LARGE FIBER LOSS IN OF2 | — |
| 3 | — | — | O | — | FIBER FAILURE IN OF3 | — |
| 4 | — | — | O | O | IMPOSSIBLE COMBINATION WITH APR=ON | — |
| 5 | — | O | — | — | LARGE LOSS IN TRANSMISSION LINE | — |
| 6 | — | O | — | ● | UPSTREAM OPTICAL AMPLIFIER SHUTDOWN | — |
| 7 | — | O | O | — | LARGE LOSS IN TRANSMISSION LINE AND FIBER FAILURE IN OF3 | — |
| 8 | — | O | — | ● | FIBER FAILURE IN OF2 | O |
| 9 | O | — | — | — | REDUCED OUTPUT IN UPSTREAM OSC | — |
| 10 | O | — | — | O | REDUCED OUTPUT IN UPSTREAM OSC AND REDUCED OUTPUT OF RAMAN AMPLIFIER | — |
| 11 | O | — | O | — | FIBER FAILURE IN OF4/UPSTREAM OSC FAILURE | — |
| 12 | O | — | O | O | IMPOSSIBLE COMBINATION WITH APR=ON | — |
| 13 | O | O | O | — | UPSTREAM OSC OUTPUT REDUCED AND LARGE LOSS IN TRANSMISSION LINE | — |
| 14 | O | O | O | ● | UPSTREAM OPTICAL AMPLIFIER SHUTDOWN AND UPSTREAM OSC OUTPUT REDUCED | — |
| 15 | O | O | O | — | LARGE LOSS IN TRANSMISSION LINE, FIBER FAILURE IN OF4/UPSTREAM OSC FAILURE | — |
| 16 | O | O | O | ● | FIBER FAILURE IN OF1 | — |

— : ALM NOT DETECTED, O : ALM DETECTED, ● : MASKED ALM

OSC : SUPERVISORY SIGNAL TRANSMISSION AND RECEPTION UNIT
LOS : LOSS OF MAIN SIGNAL ALARM
SV_LOS : LOSS OF SUPERVISORY SIGNAL ALARM
OF1 : OPTICAL FIBER OF TRANSMISSION LINE
OF2 : OPTICAL FIBER BETWEEN RAMAN AND OPTICAL AMPLIFIERS
OF3 : OPTICAL FIBER BETWEEN OPTICAL AMPLIFIER AND OSC
OF4 : OPTICAL FIBER BETWEEN UPSTREAM OPTICAL AMPLIFIER AND UPSTREAM OSC

OPTICAL COMMUNICATION APPARATUS AND OPTICAL WAVELENGTH MULTIPLEXING TRANSMISSION SYSTEM

INCORPORATION BY REFERENCE

This application is based upon and claims the benefit of priority from Japanese patent application No. 2009-163247, filed on Jul. 10, 2009, the disclosure of which is incorporated herein in its entirety by reference.

BACKGROUND

1. Field of the Invention

The present invention relates to an optical communication apparatus, an optical wavelength multiplexing transmission system, an optical path failure detection method, an optical path failure detection program, and a program storage medium.

2. Description of Related Art

In recent years, as disclosed in "Optical Transmission System" of Japanese Unexamined Patent Application Publication No. 2006-345070, an optical wavelength multiplexing apparatus for effectively reducing optical repeat loss while extending the optical amplification band has been developed. The optical wavelength multiplexing apparatus has the configuration including a Raman amplifier for performing Raman amplification to optical signals using strong excitation light placed in the previous stage of an optical amplifier such as an Erbium-Doped Fiber Amplifier (EDFA). FIG. 3 is a block diagram illustrating the system configuration of an optical wavelength multiplexing transmission system using the optical wavelength multiplexing apparatus of a related art. In the configuration illustrated in FIG. 3, optical wavelength multiplexing apparatuses 1A and 2A are connected to oppose each other via optical transmission lines 50 and 51. An optical wavelength multiplexing apparatus is exemplified hereinafter as the related art and exemplary embodiment of the present invention. The optical wavelength multiplexing apparatus is included in the optical communication apparatus of the present invention.

In the optical wavelength multiplexing transmission system illustrated in FIG. 3, the optical wavelength multiplexing apparatuses 1A and 2A each include a reception unit and a transmission unit. The reception unit of the optical wavelength multiplexing apparatus 1A is composed of a Raman amplifier 10 and an optical amplifier 11, which are connected in cascade via an optical fiber 15. The transmission unit of the optical wavelength multiplexing apparatus 1A is composed of an optical amplifier 13. Further, the reception unit of the optical wavelength multiplexing apparatus 2A is composed of a Raman amplifier 20 and an optical amplifier 21, which are connected in cascade via an optical fiber 25. The transmission unit of the optical wavelength multiplexing apparatus 2A is composed of an optical amplifier 23.

In the optical wavelength multiplexing apparatuses 1A and 2A of FIG. 3, the reception units for receiving optical signals from each of the opposing apparatuses monitor the flatness of main signals (optical wavelength multiplexed signals) respectively output from the optical amplifiers 11 and 21, which are connected in the subsequent stages, and feed back to the optical amplifiers 11 and 21, so as to control to flatten the output spectrum of the main signals (optical wavelength multiplexed signal). Similarly, in the transmission unit for receiving the optical signals from another path of each of the optical wavelength multiplexing apparatuses 1A and 2A and transmitting the optical signals to the respective opposing apparatuses, by monitoring the flatness of main signals (optical wavelength multiplexed signals) respectively output from the optical amplifiers 13 and 23, which are connected in the subsequent stages, and feeding back to the optical amplifiers 13 and 23, the control to flatten the output spectrum of the main signals (optical wavelength multiplexed signal) is performed.

Further, the optical wavelength multiplexing apparatuses 1A and 2A respectively include supervisory signal transmission and reception units 14 and 24. The supervisory signal transmission and reception units 14 and 24 transmit and receive an OSC (Optical Supervisory Channel) signal to and from the optical amplifiers 11 and 21 which compose the reception unit for receiving the optical signals from respective opposing apparatuses, and the optical amplifiers 13 and 23 which compose the transmission unit for transmitting the optical signals to the respective opposing apparatuses. An OSC signal, i.e., a supervisory signal, is used as a control signal between the optical wavelength multiplexing apparatuses 1A and 2A.

In the event of a failure such as a disconnection of an optical fiber in the optical transmission line 50, for example, in the system configuration as in FIG. 3, a loss of main signal alarm is generated in the optical amplifier 11, and a loss of supervisory signal alarm is also generated in the supervisory signal transmission and reception unit 14 which is monitoring signals from the optical amplifier 11.

Moreover, the supervisory signal transmission and reception unit 14 performs APR (Automatic Power Reduction) control (the control to reduce the optical output signal level to a predetermined level in advance) defined in the ITU-T G.664 standard, and transmits the OSC signal for directing to carry out the APR control to the optical wavelength multiplexing apparatus 2A which is the opposing apparatus via the optical amplifier 13 of the transmission unit. In response to the OSC signal, the supervisory signal transmission and reception unit 24 in the optical wavelength multiplexing apparatus 2A performs the APR control directed by the OSC signal to reduce the output level of the optical signal to the optical transmission line 50.

By performing the APR control, the output level of the optical signal shifts to the low-output-level state, thereby reducing the influence on the worker when performing the recovery operation of the optical transmission line 50.

As mentioned above, in the optical wavelength multiplexing apparatus of the related art as illustrated in FIG. 3, if a failure such as a disconnection in an optical fiber is generated in the optical transmission line 50, and an input optical signal is blocked, the supervisory signal transmission and reception unit 14 of the optical wavelength multiplexing apparatus 1A on the receiving side detects the loss of supervisory signal, and also performs the APR control defined in the ITU-T G.664 in response to the information of the loss of main signal from the optical amplifier 11. However, the blocked state of the input optical signal is generated in a similar manner not only when a failure occurs in the optical transmission line 50 between the optical wavelength multiplexing apparatuses 1A and 2A, but for example when a failure occurs in the optical fiber 15 which connects the Raman amplifier 11 and the optical amplifier 11 in cascade.

That is, in FIG. 3, if a failure occurs in the optical fiber 15 between the Raman amplifier 10 and the optical amplifier 11, a loss of main signal (optical wavelength multiplexed signal) alarm is generated in the optical amplifier 11, and a loss of supervisory signal alarm is generated in the supervisory signal transmission and reception unit 14. Thus the supervisory signal transmission and reception unit 14 performs the APR control in a similar way as the abovementioned case of a failure in the optical transmission line 50. As the result, the state shifts to the state of reducing the output level of the optical amplifier 23 of the optical wavelength multiplexing apparatus 2 on the opposing apparatus side.

As described above, in the optical wavelength multiplexing apparatus of the related art, for the circuit configuration having multiple optical circuits connected in cascade as the communication system of optical signals like the Raman amplifier and the optical amplifier with the amplification function for optical signals that are connected in cascade, even if a failure occurs in the optical fiber in the apparatus including multiple optical circuits connected in cascade, the failure point cannot be identified. Therefore, such failure is processed in a similar way as the failure in the optical transmission line connecting between the opposing apparatuses. Thus there is a possibility that the replacing operation of the optical transmission line where no failure occurs is performed and causes a problem that substantially delays the recovery.

SUMMARY

The present invention is made in light of such situation, and aims to provide an optical communication apparatus and an optical wavelength multiplexing transmission system that allow easy identification of the failure point even for the configuration having multiple circuits connected in cascade as the communication system of the optical signals in the apparatus.

In a first exemplary aspect of the invention, an optical communication apparatus that includes an optical signal reception unit that receives an optical signal, where the optical signal is a multiplexed signal of a main signal and a supervisory signal, and a supervisory signal transmission and reception unit that is connected to an output end of the optical signal reception unit, detects whether or not the supervisory signal exists, and outputs a main signal transmission stop instruction for directing a transmitting source of the main signal to stop outputting the main signal if the supervisory signal cannot be detected. If the optical signal reception unit detects a loss of the main signal but not a loss of the supervisory signal, and also if the supervisory signal transmission and reception unit detects the loss of the supervisory signal, the optical communication apparatus evaluates that a failure is generated in the optical path.

In a second exemplary aspect, an optical communication apparatus that transmits and receives a multiplexed signal of a main signal and a supervisory signal with an opposing apparatus via an optical transmission line that includes multiple optical circuits that are connected in cascade by an optical fiber as a communication system of the main signal, where the main signal is an optical signal, a supervisory signal transmission and reception unit that transmits and receives the supervisory signal of the optical signal via the optical transmission line with the opposing apparatus, and a failure point identification unit that detects a generation of a failure according to a combination of a presence or absence of a loss of the main signal and a loss of the supervisory signal in the multiple optical circuits, and a presence or absence of a detection of the loss of supervisory signal in the supervisory signal transmission and reception unit, while identifying a generation point of the generated failure. In response to an input of information of the loss of the main signal and the loss of the supervisory signal from the first stage optical circuit to the failure point identification unit, the supervisory signal transmission and reception unit transmits a transmission stop instruction for the main signal to the opposing apparatus by the supervisory signal, and suppose that one of the optical circuit is referred to as an optical circuit A and the subsequent optical circuit of the optical circuit A is referred to as an optical circuit B, if the optical circuit A detects the loss of the main signal but not the loss of the supervisory signal, and the optical circuit B detects the loss of the supervisory signal, the failure point identification unit evaluates that a failure exists in the optical circuit connected in cascade between the optical circuit A and the optical circuit B.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 2 illustrates an example of a failure point identification table to isolate the failure point.

EXEMPLARY EMBODIMENTS

Figure 3:
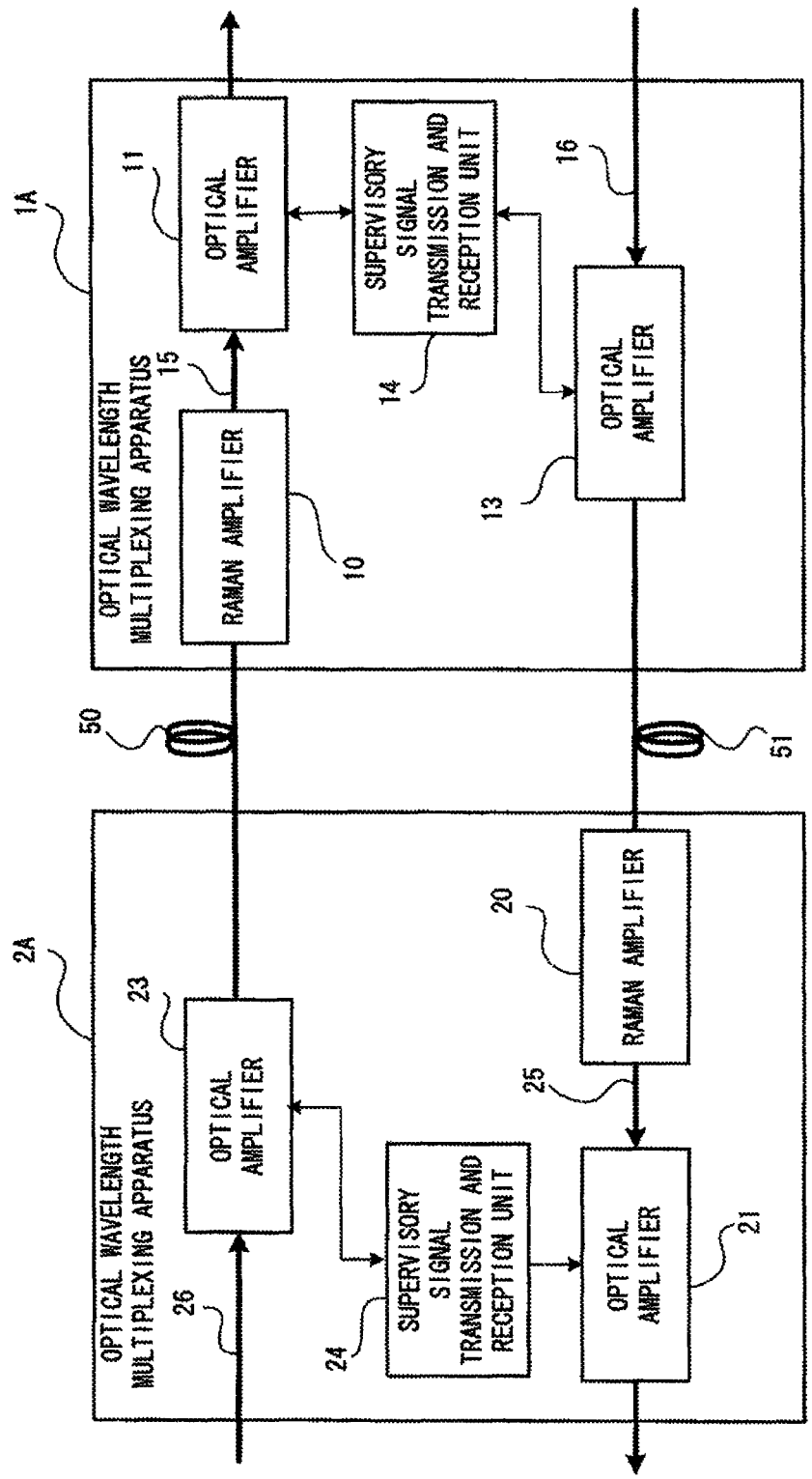
FIG. 3 is a block diagram illustrating an optical wavelength multiplexing transmission system using an optical wavelength multiplexing apparatus according to a related art.

Hereinafter, preferred exemplary examples of an optical communication apparatus, an optical wavelength multiplexing transmission system, an optical path failure detection method, an optical path failure detection program, and a program storage medium are described with reference to the attached drawings. The following explanation of the exemplary embodiment uses an optical wavelength multiplexing apparatus in which the Raman amplifier and the optical amplifier illustrated in FIG. 3 are connected in cascade via an optical fiber in the apparatus as an example of the optical communication apparatus. However, the present invention is not limited to such situation, and the number of optical circuits connected in cascade as the communication system of the optical signals is not limited to two but may be three or more. Further, each optical circuit connected in cascade may be any one or a combination of multiple kinds of amplifiers such as a rare-earth-doped fiber amplifier, a Raman amplifier, and a semiconductor optical amplifier. Alternatively, the optical circuits connected in cascade may include other optical circuits such as an optical beam splitter, an optical switch, and an optical coupler.

(Feature of the Present Invention)

Prior to the explanation of the exemplary embodiment of the present invention, the outline of the feature of the present invention is described first. An optical communication apparatus according to the present invention includes an optical signal reception means that receives an optical signal which is a multiplexed signal of a main signal and a supervisory signal, and a supervisory signal transmission and reception unit that is connected to an output end of the optical signal reception means, detects an existence of the supervisory signal, and outputs a main signal transmission stop instruction for directing a transmitting source of the main signal to stop outputting the main signal if the supervisory signal cannot be detected. If the optical signal reception means detects a loss of the main signal but not a loss of the supervisory signal, and also if the supervisory signal transmission and reception unit detects the loss of the supervisory signal, the optical communication apparatus evaluates that a failure is generated in the optical path. This evaluation enables to provide an optical communication apparatus that allows easy identification of a failure point, and particularly easy isolation of a failure in an optical path interposed between the optical signal reception means and the supervisory signal transmission and reception unit from a failure in the optical transmission line that transmits the multiplexed signal composed of the main signal and the supervisory signal which is transmitted from the transmitter to the optical signal reception means. An optical communication apparatus having multiple optical circuits connected in cascade via an optical path such as an optical fiber, for example an optical communication apparatus having a Raman amplifier for amplifying optical signals using the principle of Raman scattering and an optical amplifier, is described hereinafter. Such optical communication apparatus includes a monitoring unit (for example, network firmware) that monitors alarms generated in each of the multiple optical circuits connected in cascade in the optical communication apparatus, and combines the alarms to identify the failure point. The monitoring unit enables to isolate a failure in the optical fiber inside the optical communication apparatus from a failure in the optical transmission line connecting between the opposing apparatuses. In case of the failure in the optical fiber inside the optical communication apparatus, the monitoring unit further enables to isolate the failure in a particular optical fiber of the multiple optical circuits connected in cascade.

(Configuration of the Exemplary Embodiment)

An exemplary embodiment is an optical wavelength multiplexing transmission system including multiple optical wavelength multiplexing apparatuses opposed to each other. The optical wavelength multiplexing apparatus includes multiple optical circuits connected in cascade as the communication system of the optical signals which is multiplexed signals of the main signal and the supervisory signal, transmits and receives the optical signals to and from the opposing optical wavelength multiplexing apparatus (communication apparatus) via the optical transmission line, and monitors the main signal and the supervisory signal by the optical circuits. This system allows easy identification of the failure point. The identification of the failure point can also be made easy in the optical wavelength multiplexing apparatus (communication apparatus) and the optical path failure detection method that are applied to the optical wavelength multiplexing transmission system of this exemplary embodiment, and the optical path failure detection program that realizes the optical path failure detection method.

The optical wavelength multiplexing apparatuses in the optical wavelength multiplexing transmission system of this exemplary embodiment each include the monitoring unit. The monitoring unit monitors the alarm state of each optical circuit connected in cascade as the communication system of the optical signals and combines the monitored results. This enables to identify which part of the optical transmission line between the opposing apparatuses and the optical circuits connected in cascade (for example, the optical transmission line and the optical fiber between the Raman amplifier and the optical amplifier in the apparatus) have a failure. Thus the failure recovery operation can be carried out easier and in a shorter time than the optical wavelength multiplex transmission system which is explained as the related art with reference to FIG. 3. The optical wavelength multiplexing apparatus includes the optical circuits, which are the Raman amplifier and the optical amplifier connected in cascade. The monitoring unit (for example, network firmware) combines the alarms generated in the Raman amplifier, the optical amplifier, and the supervisory signal transmission and reception unit so as to isolate the failure in the optical fiber inside the apparatus connecting between the Raman amplifier and the optical amplifier from the failure in the optical transmission line connecting between the opposing apparatuses.

Figure 1:
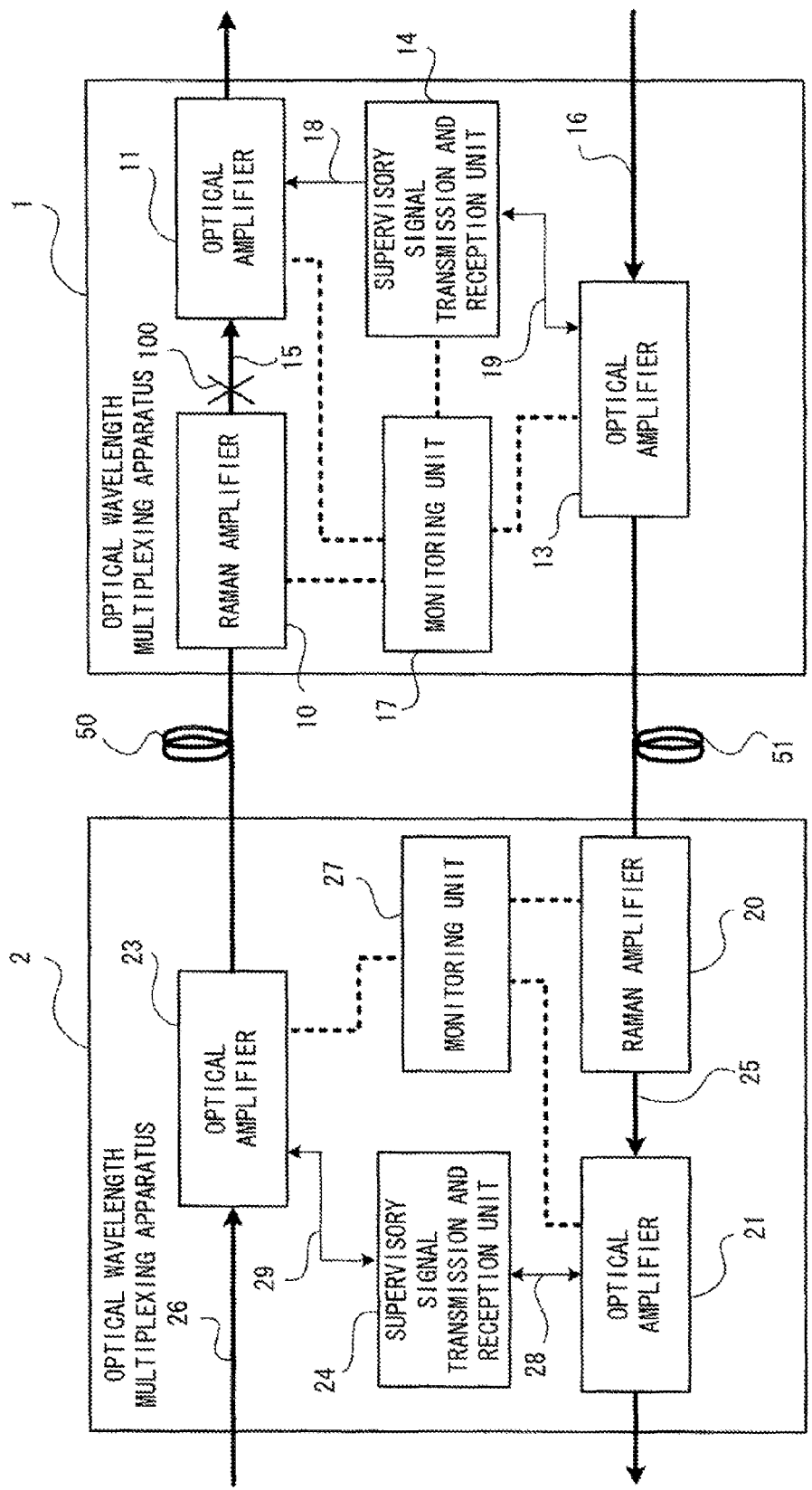
FIG. 1 illustrates the system configuration of an exemplary embodiment of an optical wavelength multiplexing transmission system using an optical wavelength multiplexing apparatus according to the present invention.

FIG. 1 illustrates the system configuration of one exemplary embodiment of the optical wavelength multiplexing transmission system using the optical wavelength multiplexing apparatus according to the present invention. As with the configuration of the related art illustrated in FIG. 3, the transmission systems of FIG. 1 has the configuration in which optical wavelength multiplexing apparatuses 1 and 2 are connected to oppose each other via optical transmission lines 50 and 51.

For the simplicity of the explanation, in a similar manner as the optical wavelength multiplexing apparatuses 1A and 2A according to the related art of FIG. 3, the optical wavelength multiplexing apparatuses 1 and 2 shall have the configuration including a Raman amplifier for performing Raman amplification to optical signals using strong excitation light placed in the previous stage of an optical amplifier such as an erbium-doped fiber amplifier (EDEA) (the circuit configuration example having two-stage circuits connected in cascade), as an example of multiple optical circuits connected in cascade via optical fibers in the apparatus. However, the present invention is not limited to the optical wavelength multiplexing apparatus with the configuration having two-stage optical circuits connected in cascade as the communication system of the optical signals, but can be applied to the configuration with any number of stages.

As illustrated in FIG. 1, unlike the optical wavelength multiplexing apparatuses 1A and 2A of the related art in FIG. 3, the optical wavelength multiplexing apparatuses 1 and 2 of this exemplary embodiment respectively include monitoring units 17 and 27 having the function to identify the failure points (equivalent to the abovementioned the failure point identification unit). The details of these monitoring units 17 and 27 are described later. The optical wavelength multiplexing apparatuses 1 and 2 of this exemplary embodiment illustrated in FIG. 1 each include a reception unit and a transmission unit. The reception unit of the optical wavelength multiplexing apparatus 1 is composed of a Raman amplifier 10 and an optical amplifier 11 which are connected in cascade via an optical fiber 15 (equivalent to the abovementioned first optical fiber). The transmission unit of the optical wavelength multiplexing apparatus 1 is composed of an optical amplifier 13. Further, the reception unit of the optical wavelength multiplexing apparatus 2 is composed of a Raman amplifier 20 and an optical amplifier 21 which are connected in cascade via an optical fiber 25. The transmission unit of the optical wavelength multiplexing apparatus 2 is composed of an optical amplifier 23.

Further, in a similar manner as the optical wavelength multiplexing apparatuses 1A and 2A of FIG. 3 explained as the related art, in the optical wavelength multiplexing apparatuses 1 and 2 of FIG. 1, the reception units for receiving optical signals from each of the opposing apparatuses monitor the flatness of main signals (optical wavelength multiplexed signals) respectively output from the optical amplifiers 11 and 21, which are connected in the subsequent stages, and feed back to the optical amplifiers 11 and 21, so as to control to flatten the output spectrum of the main signals (optical wavelength multiplexed signals). Similarly, in the transmission unit for receiving the optical signals from another path of each of the optical wavelength multiplexing apparatuses 1A and 2A and transmitting the optical signals to the respective opposing apparatuses, by monitoring the flatness of main signals (optical wavelength multiplexed signals) respectively output from the optical amplifiers 13 and 23, which are connected in the subsequent stages, and feeding back to the optical amplifiers 13 and 23, the control to flatten the output spectrum of the main signals (optical wavelength multiplexed signal) is performed.

Further, in a similar manner as the optical wavelength multiplexing apparatuses 1A and 2A of the related art of FIG. 3, the optical wavelength multiplexing apparatuses 1 and 2 respectively include supervisory signal transmission and reception units 14 and 24. The supervisory signal transmission and reception units 14 and 24 respectively transmit and receive OSC (Optical Supervisory Channel) signals to and from the optical amplifiers 11 and 12 forming the reception units that receive optical signals from each opposing apparatus and the optical amplifiers 13 and 23 forming the transmission units that transmit optical signals to each opposing apparatus. Thus in the optical wavelength multiplexing apparatuses 1 and 2, the supervisory signal transmission and reception units 14 and 24 mutually transmit and receive the OSC signal, which is a supervisory signal, between the opposing apparatuses as a control signal between stations. Moreover, the supervisory signal transmission and reception unit 14 receives the divided optical signal that is supplied to the optical amplifiers 11 and 13 to monitor the level of the OSC signal supplied to the optical amplifiers 11 and 13. If the level of the OSC signal is less than or equal to a predetermined threshold, the supervisory signal transmission and reception unit 14 generates a loss of OSC signal alarm. In a similar manner, the supervisory signal transmission and reception unit 24 receives the divided optical signal that is supplied to the optical amplifiers 21 and 23 to monitor the level of the OSC signal supplied to the optical amplifiers 21 and 23. If the level of the OSC signal is less than or equal to the predetermined threshold, the supervisory signal transmission and reception unit 24 generates a loss of OSC signal alarm.

Next, the monitoring units 17 and 27 in the optical wavelength multiplexing apparatuses 1 and 2 of FIG. 1 that are newly added components to the optical wavelength multiplexing apparatuses 1A and 2A of FIG. 3 are explained. The monitoring units 17 and 27 of the optical wavelength multiplexing apparatuses 1 and 2 have the function to isolate and identify the failure points. The monitoring units 17 and 27 constantly monitor alarm signals in each circuit unit connected in cascade via the optical fibers as the communication system of the optical signals in order to identify which part has the failure.

For example, the monitoring unit 17 is connected to the Raman amplifier 10 and the optical amplifier 11 which are connected in cascade, the optical amplifier 13, and the supervisory signal transmission and reception unit 14. The monitoring unit 17 monitors a loss of main signal (optical wavelength multiplexed signal) alarm and a loss of supervisory signal alarm detected and generated by the Raman amplifier 10, and a loss of main signal (optical wavelength multiplexed signal) alarm detected and generated by the optical amplifiers 11 and 13, while monitoring a loss of supervisory signal alarm generated by the supervisory signal transmission and reception unit 14.

Similarly, in the example illustrated in FIG. 1, the monitoring unit 27 is connected to the Raman amplifier 20 and the optical amplifier 21 which are connected in cascade, the optical amplifier 23, and the supervisory signal transmission and reception unit 24. The monitoring unit 27 monitors a loss of main signal (optical wavelength multiplexed signal) alarm and a loss of supervisory signal alarm detected and generated by the Raman amplifier 20, and a loss of main signal (optical wavelength multiplexed signal) alarm detected and generated by the optical amplifiers 21 and 23, while monitoring a loss of supervisory signal alarm generated by the supervisory signal transmission and reception unit 24.

Then, at the same time as detecting the failure according to the monitored alarms, the monitoring units 17 and 27 isolate and identify the generation point of the failure according to the failure point identification table of FIG. 2. If the monitoring units 17 and 27 identify the generation point of the failure, the monitoring units 17 and 27 notify to a customer engineer that the failure is generated along with identified failure point. FIG. 2 illustrates an example of the structure of the failure point identification table for isolating the failure point.

In the failure point identification table of FIG. 2, "–" indicates that no alarm is detected, "○" indicates that an alarm is detected, and "●" indicates that an alarm is detected inside the circuit but the alarm is not generated outside, which is the masked alarm state. The "masked alarm state", in which an alarm is detected in the own optical circuit but not generated outside, occurs when the subsequent stage optical circuit (the optical amplifier) does not need to generate the alarm outside as the previous stage optical circuit (the Raman amplifier) has already generated the alarm outside (outside here means the circuit other than the own circuit, in the example of FIG. 1, they are the monitoring units 17 and 27). The failure point identification table of FIG. 2 includes "No." column indicating a (case) number of a failure, "Raman amplifier 10" column indicating the state of the Raman amplifier 10, "OSC" column indicating the state of the supervisory signal transmission and reception unit 14, "Optical amplifier 11" column indicating the state of the optical amplifier 11, "LOS" column indicating a loss of main signal alarm, "SV LOS" column indicating a loss of OSC signal alarm, "Failure content" indicating the failure content, and "Optical fiber 15 failure" column indicating a failure in the optical fiber 15 directly connecting between the Raman amplifier and the optical amplifier.

The monitoring unit refers to the failure point identification table to identify whether a failure exists or not in the optical wavelength multiplexing transmission system, and identify the failure point. The failure point identified by the monitoring unit referring to the failure point identification table is identified from the "Failure content" column for each case No. in the table. The "Failure content" column in the fault part identification table of FIG. 2 is written from the viewpoint of the optical circuits and the optical fiber in the own optical wavelength multiplexing apparatus (the optical wavelength multiplexing apparatus including the monitoring unit that refers to the failure point identification table of FIG. 2 and attempting to identifying the failure point). The optical circuits and the optical fiber in the opposing optical wavelength multiplexing apparatus that transmits the main and OSC signals to the own optical wavelength multiplexing apparatus via the optical transmission line is indicated by "upstream" to distinguish from the optical circuit and the optical fiber in the own optical wavelength multiplexing apparatus. Hereinafter, it is assumed that the optical wavelength multiplexing apparatus 1 is the own optical wavelength multiplexing apparatus, and the optical wavelength multiplexing apparatus 2 is the upstream optical wavelength multiplexing apparatus. Further, in the optical wavelength multiplexing apparatuses 1 and 2, it is assumed that APR is started (APR is ON) and they are under the control of APR (Automatic Power Reduction).

In the "Failure content" column, OF1 indicates the optical fiber 50 of the transmission line for transmitting the output from the upstream optical wavelength multiplexing apparatus 2 to the own optical wavelength multiplexing apparatus 1.

OF2 indicates the optical fiber 15 which connects the Raman amplifier 10 and the optical amplifier 11 in the own optical wavelength multiplexing apparatus 1. OF3 indicates the optical fiber 18 which connects the optical amplifier 11 and the supervisory signal transmission and reception unit 14 in the own optical wavelength multiplexing apparatus 1. OF4 indicates the optical fiber 29 which connects the optical amplifier 23 and the supervisory signal transmission and reception unit 24 in the upstream optical wavelength multiplexing apparatus 2. The "reduced output" in the "Failure content" column means that the output is less than or equal to the predetermined threshold. Further, "large loss" in the "Failure content" column means that the transmission loss in the transmission line is more than or equal to the predetermined threshold.

Hereinafter, the identification method of the failure point by the optical wavelength multiplexing transmission system according to the exemplary embodiment of FIG. 1 is explained in detail with reference to the failure point identification table of FIG. 2. The case No. 1 indicates that each monitored unit is normal. The case No. 2 indicates that the output from the Raman amplifier 10 is reduced, or the transmission loss in the optical fiber 15 connecting the Raman amplifier 10 and the optical amplifier 11 is large. The case No. 3 indicates that there is a failure in the optical fiber 18 connecting the optical amplifier 11 and the supervisory signal transmission and reception unit 14 in the own optical wavelength multiplexing apparatus 1, and the signaling channel of the OSC signal is blocked. The case No. 4 is an impossible case while APR control is performed normally. The case No. 4 arises when multiple failure occurs in which the APR control cannot be carried out, for example when a failure occurs in both of the transmission lines 50 and 51. This means that an error is generated in the monitoring unit 17 itself or in the alarm detection unit of each of the optical circuits transmitting alarms to the monitoring unit 17.

The case No. 5 indicates that the transmission loss in the optical transmission line 50 connecting between the optical wavelength multiplexing apparatuses 1 and 2 is large. The case No. 6 indicates shutdown of the optical amplifier 23 in the upstream optical wavelength multiplexing apparatus 2. The shutdown of the optical amplifier is generated due to a failure or shutdown of the power supply. While the optical amplifier is shutdown, the output of the main signal from the optical amplifier is stopped. However the OSC signal transmitted from the supervisory signal transmission and reception unit passes through the optical amplifier and output to the optical transmission line. The case No. 7 indicates the composite failure of the cases No. 5 and No. 3. That is, the transmission loss in the optical transmission line 50 connecting the optical wavelength multiplexing apparatuses 1 and 2 is large, and the signaling channel of the OSC signal is blocked due to a failure in the optical fiber 18 connecting the optical amplifier 11 and the supervisory signal transmission and reception unit 14 in the own optical wavelength multiplexing apparatus 1.

The case No. 8 indicates that a failure 100 exists in the optical fiber 15 connecting the Raman amplifier 10 and the optical amplifier 11, and the signaling channel by the optical fiber 15 is blocked. The case No. 9 indicates that the output (OSC signal) from the supervisory signal transmission and reception unit 24 in the upstream optical wavelength multiplexing apparatus 2 is reduced. The case No. 10 indicates that the output (OSC signal) from the supervisory signal transmission and reception unit 24 in the upstream optical wavelength multiplexing apparatus 2 is reduced, and the output from the Raman amplifier 10 in the own optical wavelength multiplexing apparatus 1 is reduced. The case No. 11 indicates that a failure exists in the optical fiber 29 connecting the optical amplifier 23 and the supervisory signal transmission and reception unit 24 in the upstream optical wavelength multiplexing apparatus 2, or a failure exists in the supervisory signal transmission and reception unit 24 in the upstream optical wavelength multiplexing apparatus 2.

The case No. 12 is an impossible case while APR is performed normally. The case No. 12 arises when multiple failure is generated in which the APR control cannot be carried out, for example when a failure occurs in both of the transmission lines 50 and 51. The case No. 13 indicates that the output (OSC signal) from the supervisory signal transmission and reception unit 24 in the upstream optical wavelength multiplexing apparatus 2 is reduced, and the transmission loss in the optical transmission line 50 is large. The case No. 14 is a case where the failures of the both cases No. 6 and No. 9 occur. This means that the optical amplifier 23 in the upstream optical wavelength multiplexing apparatus 2 is blocked (shutdown), and the output (OSC signal) from the supervisory signal transmission and reception unit 24 in the upstream optical wavelength multiplexing apparatus 2 is reduced.

The case No. 15 is a case where the failures of the both cases No. 5 and No. 11 occur. This means that the transmission loss in the optical transmission line 50 connecting between the optical wavelength multiplexing apparatus 1 and 2 is large, and a failure exists in the optical fiber 29 connecting the optical amplifier 23 and the supervisory signal transmission and reception unit 24 in the upstream optical wavelength multiplexing apparatus 2, or a failure exists in the supervisory signal transmission and reception unit 24 in the upstream optical wavelength multiplexing apparatus 2. The case No. 16 indicates that a failure exists in the optical transmission line 50 connecting between the optical wavelength multiplexing apparatuses 1 and 2, and the signaling channel by the optical transmission line 50 is blocked.

The method of identifying the failure point by referring to the failure point identification table of FIG. 2 in the optical wavelength multiplexing transmission system of the exemplary embodiment of FIG. 1 is described in detail. In the optical wavelength multiplexing transmission system which performs the APR control, if the supervisory signal transmission and reception unit 14 detects a loss of OSC signal, the main signal is not supplied to the Raman amplifier 10 and the Raman amplifier 10 detects a loss of main signal, even if the optical transmission line 50 is normal. Therefore, there is a disadvantage that the failure 100 generated in the optical fiber 15 connecting the Raman amplifier 10 and the optical amplifier 11 is evaluated as a failure in the optical transmission line 50. As described with reference to FIG. 3, the optical wavelength multiplexing transmission system illustrated as the related art in FIG. 3 cannot overcome this disadvantage.

On the other hand, in the exemplary embodiment of the present invention of FIG. 1, as illustrated in the case No. 8 of FIG. 2, the failure 100, which is the block of the signaling channel generated in the optical fiber 15 connecting the Raman amplifier 14 and the optical amplifier 11, can be distinguished from the failure of the signaling channel block in the optical transmission line 50 connecting between the optical wavelength multiplexing apparatus 1 and 2. This exemplary embodiment includes the monitoring unit 17 to monitor the OSC signal in the Raman amplifier 10. Thus, even if the Raman amplifier detects the loss of main signal, the case No. 8 in which the OSC signal is detected by the Raman amplifier 10 and the loss of OSC signal is detected by the supervisory signal transmission and reception unit 14 can be distinguished from the case No. 16 in which the loss of main signal and the loss of OSC signal are detected by the Raman amplifier 10, and the loss of OSC signal is detected by the loss of main signal is detected by the supervisory signal transmission and reception unit 14.

However, the present invention is not limited to the configuration illustrated in FIG. 1. For example, a switch circuit for blocking the optical signals from outputting to the subsequent stage optical circuit may be placed in each optical circuit connected in cascade as the communication system of the optical signals in the optical signal in optical wavelength multiplexing apparatuses 1 and 2. In such configuration, if a failure generated in the optical fiber in the optical wavelength multiplexing apparatuses 1 and 2 is identified, the switch circuit in the previous stage optical circuit which is connected to the corresponding optical fiber may be operated to block the output from the corresponding optical circuit. An example to apply the configuration to place the switch circuit for blocking the output of the optical signals to the subsequent stage optical circuit in each optical circuit connected in cascade as the communication system of the optical signals in the optical wavelength multiplexing apparatus 1 and 2 is described hereinafter. One such example is that the configuration in which if a failure generated in the optical fiber 15 in the optical wavelength multiplexing apparatus 1 is identified, the switch circuit in the Raman amplifier 10, which is the previous stage optical circuit connected to the corresponding optical fiber 15, is operated to block the output from the Raman amplifier 10.

In such configuration, it is not necessary to transmit an APR instruction to the opposing apparatus (for example the optical wavelength multiplexing apparatus 2), and the opposing apparatus, for example the optical wavelength multiplexing apparatus 2, can also generate an alarm to a customer engineer, thereby preventing from carrying out unnecessary failure measures. That is, it is possible to prevent from carrying out unnecessary failure measures in the optical wavelength multiplexing apparatus 2, which is the opposing apparatus, by the APR control from the optical wavelength multiplexing apparatus 1 having the failure even when no failure is generated in the optical amplifier and the optical transmission line on the transmission side, for example the optical amplifier 23 and the optical transmission line 50 in the optical wavelength multiplexing apparatus 2. In the related art of FIG. 3, if a failure is generated in the optical fiber 15 in the optical wavelength multiplexing apparatus 1, the opposing apparatus side, for example the optical wavelength multiplexing apparatus 2 side, generates an alarm to a customer engineer, thereby leading to carry out unnecessary failure measures. However by the configuration to operate the switch circuit in the Raman amplifier 10, which is the previous stage optical circuit of the optical fiber 15, and blocking the output from the Raman amplifier 10, it is possible to prevent from carrying out the unnecessary failure measures on the optical wavelength multiplexing apparatus 2 side as mentioned above. Note that in such case, the combination of the existence of the loss of input alarm in the failure point identification table of FIG. 2 is modified and specified.

The monitoring units 17 and 27 which refer to the failure point identification table and identify the failure point may be configured as the wired logic optical circuits. Alternatively, the monitoring units 17 and 27 may be realized for example as firmware in the supervisory signal transmission and reception unit (in other words, network firmware for processing various supervisory signals and controlling inside the optical wavelength multiplexing apparatus and between the opposing apparatuses).

(Explanation of the Operation of the Exemplary Embodiment)

Next, an example of the operation of the optical wavelength multiplexing apparatuses 1 and 2 illustrated in FIG. 1 is described hereinafter. For example, in the operation to transmit optical signals from the optical wavelength multiplexing apparatus 2 to the optical wavelength multiplexing apparatus 1, the optical signal supplied to the optical amplifier 23 is amplified by the optical amplifier 23, passes through the optical transmission line 50, and supplied to the Raman amplifier 10 in the optical wavelength multiplexing apparatus 1. The Raman amplifier 10 amplifies the optical signals using the principle of the Raman scattering. The optical signal amplified by the Raman amplifier 10 is supplied to the optical amplifier 11, further amplified by the optical amplifier 11, and output to another path. On the contrary, an optical signal supplied to the optical wavelength multiplexing apparatus 1 from another path is amplified by the optical amplifier 13, and output to the optical transmission line 51 from the optical amplifier 13.

Moreover, as with the case of the optical wavelength multiplexing apparatuses 1A and 2A in FIG. 3, the optical wavelength multiplexing apparatuses 1 and 2 of FIG. 1 transmit and receive the supervisory signal for monitoring between the opposing apparatuses other than the main signal (optical wavelength multiplexed signal) between the opposing apparatuses via the optical transmission line 50, which is one optical fiber, and another optical transmission line 51. That is, in the transmission systems of FIG. 1 using the optical wavelength multiplexing apparatus, the supervisory signal transmission and reception units 14 and 24 communicate the supervisory signal, and monitor the states of the transmission lines 50 and 51, and the optical wavelength multiplexing apparatuses 1 and 2.

As mentioned above, the APR control defined in the ITU-T G.664 standard is performed using the supervisory signal. The APR control is an example of monitoring the transmission system by the supervisory signal. A case is considered hereinafter in which a failure is generated in the optical transmission line 50. At this time, the Raman amplifier 10 generates the loss of main signal alarm and the loss of supervisory signal alarm. Further, the optical amplifier 11 generates the loss of main signal alarm. Then, the supervisory signal transmission and reception unit 14 monitors the supervisory signal (OSC signal) supplied to the optical amplifier 11, detects the loss of supervisory signal, and generates the loss of supervisory signal. The supervisory signal transmission and reception unit 14 which detected the loss of supervisory signal transmits an APR execution instruction to the optical wavelength multiplexing apparatus 2, which is the opposing apparatus. In response to the APR execution instruction, the supervisory signal transmission and reception unit 24 of the optical wavelength multiplexing apparatus 2 outputs a stop instruction for the main signal with high output level. In response to the stop instruction for the main signal, the optical amplifier 23 stops outputting the main signal, and executes the APR operation to reduce the output level. However, the optical amplifier 23 which received the stop instruction for the main signal outputs the supervisory signal transmitted from the supervisory signal transmission and reception unit 24 as it is.

As a result, the Raman amplifier 10 in the optical wavelength multiplexing apparatus 1 which receives the optical signals from the optical transmission line 50 detects the loss of main signal and generates the loss of main signal alarm. Further, in the supervisory signal transmission and reception unit 24 and the optical amplifier 23 of the optical wavelength multiplexing apparatus 2, although the monitoring control operation is not stopped, a failure is generated in the optical transmission line 50. Thus the Raman amplifier 10 of the optical wavelength multiplexing apparatus 1 detects the loss of supervisory signal and generates the loss of supervisory signal alarm.

If a failure is generated in the optical transmission line 50, not only the Raman amplifier 10 generates the loss of main signal alarm and the loss of supervisory signal alarm, but the main signal and the supervisory signal from the Raman amplifier 10 are blocked. Therefore, the optical amplifier 11 connected in the subsequent stage generates the loss of main signal alarm, and the supervisory signal transmission and reception unit 14 generates the loss of supervisory signal alarm.

On the other hand, if the failure 100 as in FIG. 1 is generated in the optical fiber 15 between the Raman amplifier 10 and the optical amplifier 11 in the optical wavelength multiplexing apparatus 1, the optical amplifier 11 detects the loss of main signal and generates the loss of main signal alarm, and the supervisory signal transmission and reception unit 14 detects the loss of supervisory signal and generates the loss of supervisory signal alarm. As a result, the supervisory signal transmission and reception unit 14 detects the loss of supervisory signal and generates the loss of supervisory signal alarm by itself, receives the loss of main signal alarm from the optical amplifier 11, and executes the APR control defined in the ITU-T G.664 standard.

Accordingly, as mentioned above, the supervisory signal transmission and reception unit 14 in the optical wavelength multiplexing apparatus 1 transmits the APR execution to the optical wavelength multiplexing apparatus 2, which is the opposing apparatus. In response to the APR execution instruction, the supervisory signal transmission and reception unit 24 of the optical wavelength multiplexing apparatus 2 outputs a stop instruction for the main signal with high output level. In response to the stop instruction for the main signal, the optical amplifier 23 stops outputting the main signal. However, in response to the stop instruction for the main signal, the optical amplifier 23 outputs the supervisory signal as it is. As described above, in the optical wavelength multiplexing apparatus 2 which received the APR execution instruction, the optical amplifier 23 executes the APR operation that stops outputting the main signal and reduces the output level thereof, but outputs the supervisory signal as it is.

Consequently, the Raman amplifier 10 of the optical wavelength multiplexing apparatus 1 which receives the optical signals from the optical transmission line 50 detects the loss of main signal and generates the loss of main signal alarm. However, as the supervisory signal transmission and reception unit 24 and the optical amplifier 23 in the optical wavelength multiplexing apparatus 2 have not stopped the monitoring control operation, the Raman amplifier 10 in the optical wavelength multiplexing apparatus 1 continues to receive the supervisory signals from the optical transmission line 50 and does not detect the loss of supervisory signal, thus not generating the loss of supervisory signal alarm.

As is obvious from the above explanation, if the monitoring unit 17 receives the loss of main signal alarm and the loss of supervisory signal alarm from the Raman amplifier 10, the loss of main signal alarm from the optical amplifier 11, and the loss of supervisory signal alarm from the supervisory signal transmission and reception unit 14 (the case No. 16), the monitoring unit 17 evaluates that a failure is generated in the optical transmission line 50 by referring to the failure point identification table of FIG. 2. On the other hand, if the monitoring unit 17 receives the loss of main signal alarm but not the loss of supervisory signal alarm from the Raman amplifier 10, receives the loss of main signal alarm from the optical amplifier 11, and the loss of supervisory signal alarm from the supervisory signal transmission and reception unit 14 (the case No. 8), the monitoring unit 17 evaluates that the failure 100 is generated in the optical fiber 15 between the Raman amplifier 10 and the optical amplifier 11 in the optical wavelength multiplexing apparatus 1.

However, as described above, the failure point can be identified also by the configuration including the switch circuit for blocking the output of the optical signals placed in each optical circuit that forms the communication system of the optical signals in the optical wavelength multiplexing apparatuses 1 and 2. In such case, devaluated that a failure is generated in the optical fiber connecting between each optical circuit forming the communication system of the optical signals, for example if evaluated that the failure 100 is generated in the optical fiber 15 connecting between the Raman amplifier 10 and the optical amplifier 11, the following control can be carried out. The control is to operate the switch circuit in the optical circuit placed in the previous stage of the corresponding optical fiber having the failure, for example the switch circuit in the Raman amplifier 10 which is the previous stage of the optical fiber 15 having the failure 100, and stop the transmission operation of optical signals to the optical fiber 15, so that the APR execution, instruction is not transmitted to the opposing apparatus. In such case, both the loss of main signal alarm and the loss of supervisory signal alarm are not generated in the Raman amplifier 10.

(Explanation of an Exemplary Advantage of the Exemplary Embodiment)

As described in detail above, in the optical wavelength multiplexing transmission system and the optical wavelength multiplexing apparatus and the optical fiber failure detection method that are applied to the optical wavelength multiplexing transmission system according to the exemplary embodiment illustrated in FIG. 1, the monitoring units 17 and 27 combine the result of monitoring the alarm state of each optical circuit connected in cascade as the communication system of optical signals and check up the failure point identification table. This enables to identify which part of the optical transmission line (for example, the optical transmission line 50) between the opposing apparatuses and the optical circuits connected in cascade (for example, the Raman amplifier 10, the optical amplifier 11, and the optical fiber 15) has the failure. Accordingly, the failure recovery operation can be performed easier and in a shorter time than the optical wavelength multiplex transmission system illustrated as the related art in FIG. 3.

The configuration of the preferred exemplary embodiment of the present invention is described above. However, such exemplary examples are merely exemplifications of the present invention and take notice that they do not limit the present invention at all. A person skilled in the art will readily understand that the present invention can be modified in various ways depending on a particular application without departing from the scope of the present invention. FIG. 1 illustrates an example of applying the present invention to the optical wavelength multiplexing transmission system composed of the optical wavelength multiplexing apparatuses 1 and 2 including the Raman amplifier and the optical amplifier connected in cascade. However, the apparatus to apply the present invention does not limit the optical circuits connected in cascade only to the Raman amplifier and the optical amplifier. For example, the present invention can be applied to an optical apparatus composed of other optical circuits such as an optical beam splitter, an optical switch, and an optical coupler that has a detection function of a loss of optical signal connected in cascade.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Each of the above-described embodiments can be combined as desirable by one of ordinary skill in the art.

An exemplary advantage according to the above-described embodiments is to provide an optical communication apparatus, an optical wavelength multiplexing transmission system, an optical path failure detection method, a optical path failure detection program, and a program storage medium that allow easy identification of a failure point.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

An optical communication apparatus that includes an optical signal reception unit that receives an optical signal, where the optical signal is a multiplexed signal of a main signal and a supervisory signal, and a supervisory signal transmission and reception unit that is connected to an output end of the optical signal reception unit, detects whether or not the supervisory signal exists, and outputs a main signal transmission stop instruction for directing a transmitting source of the main signal to stop outputting the main signal if the supervisory signal cannot be detected. If the optical signal reception unit detects a loss of the main signal but not a loss of the supervisory signal, and also if the supervisory signal transmission and reception unit detects the loss of the supervisory signal, the optical communication apparatus evaluates that a failure is generated in the optical path.

(Supplementary Note 2)

The optical communication apparatus according to (Supplementary note 1), in which if the optical signal reception unit detects both of the loss of the main signal and the loss of the supervisory signal, and the supervisory signal transmission and reception unit detects the loss of the supervisory signal, the optical communication apparatus evaluates that the failure exists in an optical transmission line from a signaling source to the optical signal reception unit.

(Supplementary Note 3)

The optical communication apparatus according to (Supplementary note 1) or (Supplementary note 2), in which the supervisory signal transmission and reception unit includes an APR (Automatic Power Reduction) control function defined in ITU-T standard, and transmits an APR execution instruction as the main signal transmission stop instruction by the APR control function.

(Supplementary Note 4)

The optical communication apparatus according to one of (Supplementary note 1) to (Supplementary note 3), in which the optical signal reception unit is a Raman amplifier, the optical signal reception unit includes an optical amplifier that amplifies an output from the Raman amplifier, the supervisory signal transmission and reception unit detects the supervisory signal divided by the optical amplifier, and an output end of the Raman amplifier is directly connected to an input end of the optical amplifier via the optical path.

(Supplementary Note 5)

The optical communication apparatus according to one of (Supplementary note 1) to (Supplementary note 4), further comprising a failure point identification unit that receives detection information of the main signal and the supervisory signal in the optical signal reception unit and detection information of the supervisory signal in the supervisory signal transmission and reception unit, and evaluates an existence of a failure in an optical transmission line from the signaling source to the optical signal reception unit and the optical path.

(Supplementary Note 6)

The optical communication apparatus according to one of (Supplementary note 1) to (Supplementary note 5), in which the failure point identification unit includes a failure point identification table that associates a combination of information including optical signal reception unit detection information, which is information regarding a presence or absence of the main signal and the supervisory signal detected by the optical signal reception unit, and supervisory signal transmission and reception unit detection information, which is information regarding a presence or absence of the supervisory signal detected by the supervisory signal transmission and reception unit, with a failure point, and the failure point identification unit refers to the failure point identification table to identify a generation point of the failure.

(Supplementary Note 7)

An optical communication apparatus that transmits and receives a multiplexed signal of a main signal and a supervisory signal with an opposing apparatus via an optical transmission line that includes a plurality of optical circuits that are connected in cascade by an optical fiber as a communication system of the main signal, where the main signal is an optical signal, a supervisory signal transmission and reception unit that transmits and receives the supervisory signal of the optical signal via the optical transmission line with the opposing apparatus, and a failure point identification unit that detects a generation of a failure according to a combination of a presence or absence of a loss of the main signal and a loss of the supervisory signal in the plurality of optical circuits, and a presence or absence of a detection of the loss of supervisory signal in the supervisory signal transmission and reception unit, while identifying a generation point of the generated failure. In response to an input of information of the loss of the main signal and the loss of the supervisory signal from the first stage optical circuit to the failure point identification unit, the supervisory signal transmission and reception unit transmits a transmission stop instruction for the main signal to the opposing apparatus by the supervisory signal, and suppose that one of the optical circuit is referred to as an optical circuit A and the subsequent optical circuit of the optical circuit A is referred to as an optical circuit B, if the optical circuit A detects the loss of the main signal but not the loss of the supervisory signal, and the optical circuit B detects the loss of the supervisory signal, the failure point identification unit evaluates that a failure exists in the optical circuit connected in cascade between the optical circuit A and the optical circuit B.

(Supplementary Note 8)

The optical communication apparatus according to (Supplementary note 7), in which upon a detection of the failure generation, the failure point identification unit evaluates that a failure generation point is whether the optical transmission line or the optical fiber in an apparatus connecting the plurality of the optical circuits as the communication system of the main signal, and if the failure point identification unit evaluates that the failure exists in the optical fiber in the apparatus, the failure point identification unit further evaluates which of the optical fiber connecting between the plurality of optical circuits the failure exists, and outputs an evaluated failure generation point along with an alarm.

(Supplementary Note 9)

The optical communication apparatus according to (Supplementary note 7) or (Supplementary note 8), in which an input end of the optical circuit B is directly connected to an output end of the optical circuit A by a first optical fiber, and if the optical circuit A detects the loss of the main signal but not the loss of the supervisory signal, and the optical circuit B detects the loss of the supervisory signal, the failure point identification unit evaluates that the failure exists in the first optical fiber.

(Supplementary Note 10)

The optical communication apparatus according to one of (Supplementary note 7) to (Supplementary note 9), in which if the optical circuit A detects both of the loss of the main signal and the loss of the supervisory signal, and the optical circuit B detects the loss of the supervisory signal, the failure point identification unit evaluates that the failure exists in the optical transmission line.

(Supplementary Note 11)

The optical communication apparatus according to one of (Supplementary note 7) to (Supplementary note 9), in which the optical circuit A is a Raman amplifier, the optical circuit B is an optical amplifier, and an output end of the Raman amplifier is directly connected to an input end of the optical amplifier by an optical fiber.

(Supplementary Note 12)

The optical communication apparatus according to one of (Supplementary note 7) to (Supplementary note 11), in which each of the optical circuits at least include a switch circuit that stops outputting the main signal, and if the failure point identification unit evaluates that the failure exists in the optical fiber, the failure point identification unit controls the switch circuit in the optical circuit of the previous stage to which the optical fiber evaluated to have the failure is connected, and stops outputting the main signal form the optical circuit to the optical fiber evaluated to have the failure.

(Supplementary Note 13)

The optical communication apparatus according to one of (Supplementary note 7) to (Supplementary note 12), in which the failure point identification unit includes a failure point identification table that associates a combination of a presence or absence of a loss of the optical signal alarm and a loss of the supervisory signal alarm from the optical circuit and a presence or absence of the loss of the supervisory signal from the supervisory signal transmission and reception unit with a failure point, and identifies a generation point of the failure by referring to the failure point identification table.

(Supplementary Note 14)

An optical wavelength multiplexing transmission system wherein the optical communication apparatuses according to one of (Supplementary note 1) to (Supplementary note 13) are connected each other by an optical transmission line, and the optical wavelength multiplexing transmission system transmits an optical wavelength multiplexed signal.

(Supplementary Note 15)

A method of detecting a failure in an optical path in an optical communication apparatus that comprises an optical signal reception unit for receiving an optical signal which is a multiplexed signal of a main signal and a monitoring signal, and a monitoring signal transmission and reception unit connected to an output end of the optical signal reception unit via an optical path, detects whether or not the supervisory signal exists, and outputs a main signal transmission stop instruction for directing a transmitting source of the main signal to stop outputting the main signal if the supervisory signal cannot be detected. The method includes evaluating that a failure is generated in the optical path if the optical signal reception unit detects a loss of the main signal but not a loss of the supervisory signal, and the supervisory signal transmission and reception unit detects the loss of the supervisory signal.

(Supplementary Note 16)

An optical path failure detection method in an optical communication apparatus that comprises a plurality of optical circuits connected in cascade by an optical fiber as a communication system of a main signal, which is an optical signal, and a supervisory signal transmission and reception unit that transmits and receives a supervisory signal of the optical signal via an optical transmission line with an opposing apparatus, and transmits and receives a multiplexed signal of the main signal and the supervisory signal with the opposing apparatus via the optical transmission line. The method includes detecting a generation of a failure according to a combination of a presence or absence of a loss of the main signal and a loss of the supervisory signal in the plurality of optical circuits, and an presence or absence of a detection of the loss of the supervisory signal in the supervisory signal transmission and reception unit, while identifying a generation point of the generated failure, and transmitting a transmission stop instruction for the main signal to the opposing apparatus by the supervisory signal in response to an input of information of the loss of the main signal and the loss of the supervisory signal from the first stage optical circuit to the failure point identification unit, and suppose that one of the optical circuit is referred to as an optical circuit A, and the subsequent optical circuit of the optical circuit A is referred to as an optical circuit B, if the optical circuit A detects the loss of the main signal but not the loss of the supervisory signal, and the optical circuit B detects the loss of the supervisory signal, evaluating that a failure exists in the optical circuit connected in cascade between the optical circuit A and the optical circuit B.

(Supplementary Note 17)

An optical path failure detection program for causing a computer to execute the optical path failure detection method according to (Supplementary note 15) or (Supplementary note 16).

(Supplementary Note 18)

A program storage medium readable by a computer that stores the optical path failure detection program according to (Supplementary note 17).

(Supplementary Note 19)

An optical communication apparatus that includes an optical signal reception means that receives an optical signal, where the optical signal is a multiplexed signal of a main signal and a supervisory signal, and a supervisory signal transmission and reception unit that is connected to an output end of the optical signal reception means via an optical path, detects whether or not the supervisory signal exists, and outputs a main signal transmission stop instruction for directing to stop outputting the main signal to a transmitting source of the main signal if the supervisory signal cannot be detected. If the optical signal reception means detects a loss of the main signal but not a loss of the supervisory signal, and also the supervisory signal transmission and reception unit detects the loss of the supervisory signal, the optical communication apparatus evaluates that a failure is generated in the optical path.

What is claimed is:

1. An optical communication apparatus comprising:
    an optical signal reception unit that receives an optical signal, the optical signal being a multiplexed signal of a main signal and a supervisory signal; and
    a supervisory signal transmission and reception unit that is connected to an output end of the optical signal reception unit, detects whether or not the supervisory signal exists, and outputs a main signal transmission stop instruction for directing a transmitting source of the main signal to stop outputting the main signal if the supervisory signal cannot be detected,
    wherein if the optical signal reception unit detects a loss of the main signal but not a loss of the supervisory signal, and also if the supervisory signal transmission and reception unit detects the loss of the supervisory signal, the optical communication apparatus evaluates that a failure is generated in an optical path,
    wherein the optical signal reception unit includes a Raman amplifier,
    wherein the optical signal reception unit includes an optical amplifier that amplifies an output from the Raman amplifier,
    wherein the supervisory signal transmission and reception unit detects the supervisory signal divided by the optical amplifier, and
    wherein an output end of the Raman amplifier is directly connected to an input end of the optical amplifier via the optical path.

2. The optical communication apparatus according to claim 1, wherein if the optical signal reception unit detects both of the loss of the main signal and the loss of the supervisory signal, and the supervisory signal transmission and reception unit detects the loss of the supervisory signal, the optical communication apparatus evaluates that the failure exists in an optical transmission line from a signaling source to the optical signal reception unit.

3. The optical communication apparatus according to claim 1, wherein the supervisory signal transmission and reception unit includes an APR (Automatic Power Reduction) control function defined in ITU-T standard, and transmits an APR execution instruction as the main signal transmission stop instruction by the APR control function.

4. The optical communication apparatus according to claim 1, further comprising a failure point identification unit that receives detection information of the main signal and the supervisory signal in the optical signal reception unit and detection information of the supervisory signal in the supervisory signal transmission and reception unit, and evaluates whether or not a failure exists in an optical transmission line from the signaling source to the optical signal reception unit and the optical path.

5. The optical communication apparatus according to claim 1, wherein
    the failure point identification unit includes a failure point identification table that associates a combination of information including optical signal reception unit detection information, which is information regarding a presence or absence of the main signal and the supervisory signal detected by the optical signal reception unit, and supervisory signal transmission and reception unit detection information, which is information regarding a presence or absence of the supervisory signal detected by the supervisory signal transmission and reception unit, with a failure point, and
    the failure point identification unit refers to the failure point identification table to identify a generation point of the failure.

6. An optical wavelength multiplexing transmission system wherein the optical communication apparatuses according to claim 1 are connected each other by an optical transmission line, and the optical wavelength multiplexing transmission system transmits an optical wavelength multiplexed signal.

7. An optical communication apparatus that transmits and receives a multiplexed signal of a main signal and a supervisory signal with an opposing apparatus via an optical transmission line, the optical communication apparatus comprising:
    a plurality of optical circuits that are connected in cascade by an optical fiber as a communication system of the main signal, the main signal being an optical signal;
    a supervisory signal transmission and reception unit that transmits and receives the supervisory signal of the optical signal via the optical transmission line with the opposing apparatus; and
    a failure point identification unit that detects a generation of a failure according to a combination of a presence or absence of a loss of the main signal and a loss of the supervisory signal in the plurality of optical circuits, and a presence or absence of a detection of the loss of supervisory signal in the supervisory signal transmission and reception unit, while identifying a generation point of the generated failure, wherein
    in response to an input of information of the loss of the main signal and the loss of the supervisory signal from the first stage optical circuit to the failure point identification unit, the supervisory signal transmission and reception unit transmits a transmission stop instruction for the main signal to the opposing apparatus by the supervisory signal, and
    suppose that one of the optical circuit is referred to as an optical circuit A and the subsequent optical circuit of the optical circuit A is referred to as an optical circuit B, if the optical circuit A detects the loss of the main signal but not the loss of the supervisory signal, and the optical circuit B detects the loss of the supervisory signal, the failure point identification unit evaluates that a failure exists in the optical circuit connected in cascade between the optical circuit A and the optical circuit B,
    wherein the optical circuit A is a Raman amplifier, the optical circuit B is an optical amplifier, and an output end of the Raman amplifier is directly connected to an input end of the optical amplifier by an optical fiber.

8. The optical communication apparatus according to claim 7, wherein
upon a detection of the failure generation, the failure point identification unit evaluates that a failure generation point is whether the optical transmission line or the optical fiber in an apparatus connecting the plurality of the optical circuits as the communication system of the main signal, and
if the failure point identification unit evaluates that the failure exists in the optical fiber in the apparatus, the failure point identification unit further evaluates in which of the optical fiber connecting between the plurality of optical circuits the failure exists, and outputs an evaluated failure generation point along with an alarm.

9. The optical communication apparatus according to claim 7, wherein
an input end of the optical circuit B is directly connected to an output end of the optical circuit A by a first optical fiber, and
if the optical circuit A detects the loss of the main signal but not the loss of the supervisory signal, and the optical circuit B detects the loss of the supervisory signal, the failure point identification unit evaluates that the failure exists in the first optical fiber.

10. The optical communication apparatus according to claim 7, wherein if the optical circuit A detects both of the loss of the main signal and the loss of the supervisory signal, and the optical circuit B detects the loss of the supervisory signal, the failure point identification unit evaluates that the failure exists in the optical transmission line.

11. The optical communication apparatus according to claim 7, wherein
each of the optical circuits at least include a switch circuit that stops outputting the main signal, and
if the failure point identification unit evaluates that the failure exists in the optical fiber, the failure point identification unit controls the switch circuit in the optical circuit of the previous stage to which the optical fiber evaluated to have the failure is connected, and stops outputting the main signal form the optical circuit to the optical fiber evaluated to have the failure.

12. The optical communication apparatus according to claim 7, wherein the failure point identification unit
includes a failure point identification table that associates a combination of a presence or absence of a loss of the optical signal alarm and a loss of the supervisory signal alarm from the optical circuit and a presence or absence of the loss of the supervisory signal from the supervisory signal transmission and reception unit with a failure point, and
identifies a generation point of the failure by referring to the failure point identification table.

13. An optical communication apparatus comprising:
an optical signal reception means that receives an optical signal, the optical signal being a multiplexed signal of a main signal and a supervisory signal; and
a supervisory signal transmission and reception means that is connected to an output end of the optical signal reception means via an optical path, detects whether or not the supervisory signal exists, and outputs a main signal transmission stop instruction for directing to stop outputting the main signal to a transmitting source of the main signal if the supervisory signal cannot be detected,
wherein if the optical signal reception means detects a loss of the main signal but not a loss of the supervisory signal, and also the supervisory signal transmission and reception unit detects the loss of the supervisory signal, the optical communication apparatus evaluates that a failure is generated in the optical path,
wherein the optical signal reception means includes a Raman amplifier,
wherein the optical signal reception means includes an optical amplifier that amplifies an output from the Raman amplifier,
wherein the supervisory signal transmission and reception means detects the supervisory signal divided by the optical amplifier, and
wherein an output end of the Raman amplifier is directly connected to an input end of the optical amplifier via the optical path.

14. An optical communication apparatus comprising:
a first optical circuit configured to detect a multiplexed optical signal from an optical transmission line, wherein the multiplexed optical signal includes a main signal and a supervisory signal;
a second optical circuit configured to detect the multiplexed optical signal from the first optical circuit via an optical path;
a supervisory signal transmission and reception unit configured to detect the supervisory signal from the second optical circuit; and
a monitoring unit configured to:
receive alarm signals from the first optical circuit, the second optical circuit, and the supervisory signal transmission and reception unit, and
based on the received alarm signals, determine whether a failure of a loss of the main signal at an output of the second optical circuit is generated in the optical transmission line or in the optical path.

15. The optical communication apparatus of claim 14, wherein if (i) the first optical circuit detects a loss of the main signal but not a loss of the supervisory signal, and (ii) if the supervisory signal transmission and reception unit detects a loss of the supervisory signal, the monitoring system determines that the failure is generated in the optical path.

16. The optical communication apparatus of claim 14, wherein if the first optical circuit detects a loss of the main signal and a loss of the supervisory signal, and (ii) if the supervisory signal transmission and reception unit detects a loss of the supervisory signal, the monitoring system determines that the failure is generated in the optical transmission line.

17. The optical communication apparatus of claim 14, wherein the first optical circuit is a Raman amplifier,
wherein the second optical circuit is an optical amplifier that amplifies an output from the Raman amplifier, and
wherein an output end of the Raman amplifier is directly connected to an input end of the optical amplifier via the optical path.

18. The optical communication apparatus of claim 14, wherein the supervisory signal transmission and reception unit is configured to transmit an automatic power reduction (APR) execution instruction to a transmitter of the multiplexed optical signal.

19. The optical communication apparatus of claim 14,
wherein the monitoring unit includes a failure point identification table associating a combination of alarm signals of the first optical circuit, the second optical circuit, and the supervisory signal transmission and reception unit to a source of a transmission failure, and
wherein determining whether a failure of a loss of the main signal at an output of the second optical circuit is generated in the optical transmission line or in the optical path further comprises mapping the received one or more alarm signals to the failure point identification table to determine the source of the transmission failure.

20. A method comprising:
receiving, by a monitoring unit and from a first optical circuit, a first signal indicating a status of a multiplexed optical signal in the first optical circuit, wherein the multiplexed optical signal includes a main signal and a supervisory signal;
receiving, by the monitoring unit and from a supervisory signal transmission and reception unit, a second signal indicating a status of the supervisory signal in the supervisory signal transmission and reception unit;
receiving, by a monitoring unit and from a second optical circuit, a third signal indicating a status of the main signal in the second optical circuit; and
based on the first signal, the second signal, and the third signal, determining whether a failure of a loss of the main signal at an output of a second optical circuit is generated in an optical transmission line or in an optical path,
wherein the multiplexed optical signal is received at the first optical circuit via the transmission line,
wherein the multiplexed optical signal is received at the second optical circuit from the first optical circuit via the optical path, and
wherein the supervisory signal is received at the supervisory signal transmission and reception unit from the second optical circuit.

21. The method of claim 20, wherein determining whether a failure of a loss of the main signal at an output of a second optical circuit is generated in an optical transmission line or in an optical path further comprises:
receiving the first signal indicating that the first optical circuit detects a loss of the main signal but not a loss of the supervisory signal;
receiving the second signal indicating that the supervisory signal transmission and reception unit detects a loss of the supervisory signal; and
determining that the failure is generated in the optical path.

22. The method of claim 20, wherein determining whether a failure of a loss of the main signal at an output of a second optical circuit is generated in an optical transmission line or in an optical path further comprises:
receiving the first signal indicating that the first optical circuit detects a loss of the main signal and a loss of the supervisory signal:
receiving the second signal indicating that the supervisory signal transmission and reception unit detects a loss of the supervisory signal; and
determining that the failure is generated in the optical transmission line.

23. The method of claim 20,
wherein the first optical circuit is a Raman amplifier,
wherein the second optical circuit is an optical amplifier that amplifies an output from the Raman amplifier, and
wherein an output end of the Raman amplifier is directly connected to an input end of the optical amplifier via the optical path.

24. The method of claim 20, further comprising transmitting an automatic power reduction (APR) execution instruction, by the supervisory signal transmission and reception unit, to a transmitter of the multiplexed optical signal.

25. The method of claim 20,
wherein the monitoring unit includes a failure point identification table associating the first signal and the second signal to a source of a transmission failure, and
wherein determining whether a failure of a loss of the main signal at an output of a second optical circuit is generated in an optical transmission line or in an optical path further comprises mapping the received first signal and second signal to the failure point identification table to determine the source of the transmission failure.

26. An optical communication system comprising:
a first optical wavelength multiplexing apparatus and a second optical wavelength multiplexing apparatus, the first optical wavelength multiplexing apparatus comprising:
a first optical circuit configured to detect a multiplexed optical signal from the second optical wavelength multiplexing apparatus via an optical transmission line, wherein the multiplexed optical signal includes a main signal and a supervisory signal;
a second optical circuit configured to detect the multiplexed optical signal from the first optical circuit via an optical path;
a supervisory signal transmission and reception unit configured to detect the supervisory signal from the second optical circuit; and
a monitoring unit configured to:
receive alarm signals from the first optical circuit, the second optical circuit, and the supervisory signal transmission and reception unit, and
based on the received alarm signals, determine whether a failure of a loss of the main signal at an output of the second optical circuit is generated in the optical transmission line or in the optical path.

27. The optical system of claim 26, wherein if (i) the first optical circuit detects a loss of the main signal but not a loss of the supervisory signal, and (ii) if the supervisory signal transmission and reception unit detects a loss of the supervisory signal, the monitoring system determines that the failure is generated in the optical path.

28. The optical system of claim 26, wherein if the first optical circuit detects a loss of the main signal and a loss of the supervisory signal, and (ii) if the supervisory signal transmission and reception unit detects a loss of the supervisory signal, the monitoring system determines that the failure is generated in the optical transmission line.

29. The optical system of claim 26,
wherein the first optical circuit is a Raman amplifier,
wherein the second optical circuit is an optical amplifier that amplifies an output from the Raman amplifier, and
wherein an output end of the Raman amplifier is directly connected to an input end of the optical amplifier via the optical path.

30. The optical system of claim 26, wherein the supervisory signal transmission and reception unit is configured to transmit an automatic power reduction (APR) execution instruction to the second optical wavelength multiplexing apparatus.

31. The optical system of claim 30, wherein after receiving the APR execution instruction, the second optical wavelength multiplexing apparatus is configured to reduce an optical power of the main signal transmitted to the first optical wavelength multiplexing apparatus.

32. The optical system of claim 26,
wherein the monitoring unit includes a failure point identification table associating a combination of alarm signals of the first optical circuit, the second optical circuit, and the supervisory signal transmission and reception unit to a source of a transmission failure, and
wherein determining whether a failure of a loss of the main signal at an output of the second optical circuit is generated in the optical transmission line or in the optical path further comprises mapping the received one or more alarm signals to the failure point identification table to determine the source of the transmission failure.

* * * * *